May 21, 1940. A. J. E. RYLANDER 2,201,922
STRUT FOR CYCLES AND SIMILAR VEHICLES
Filed May 27, 1938
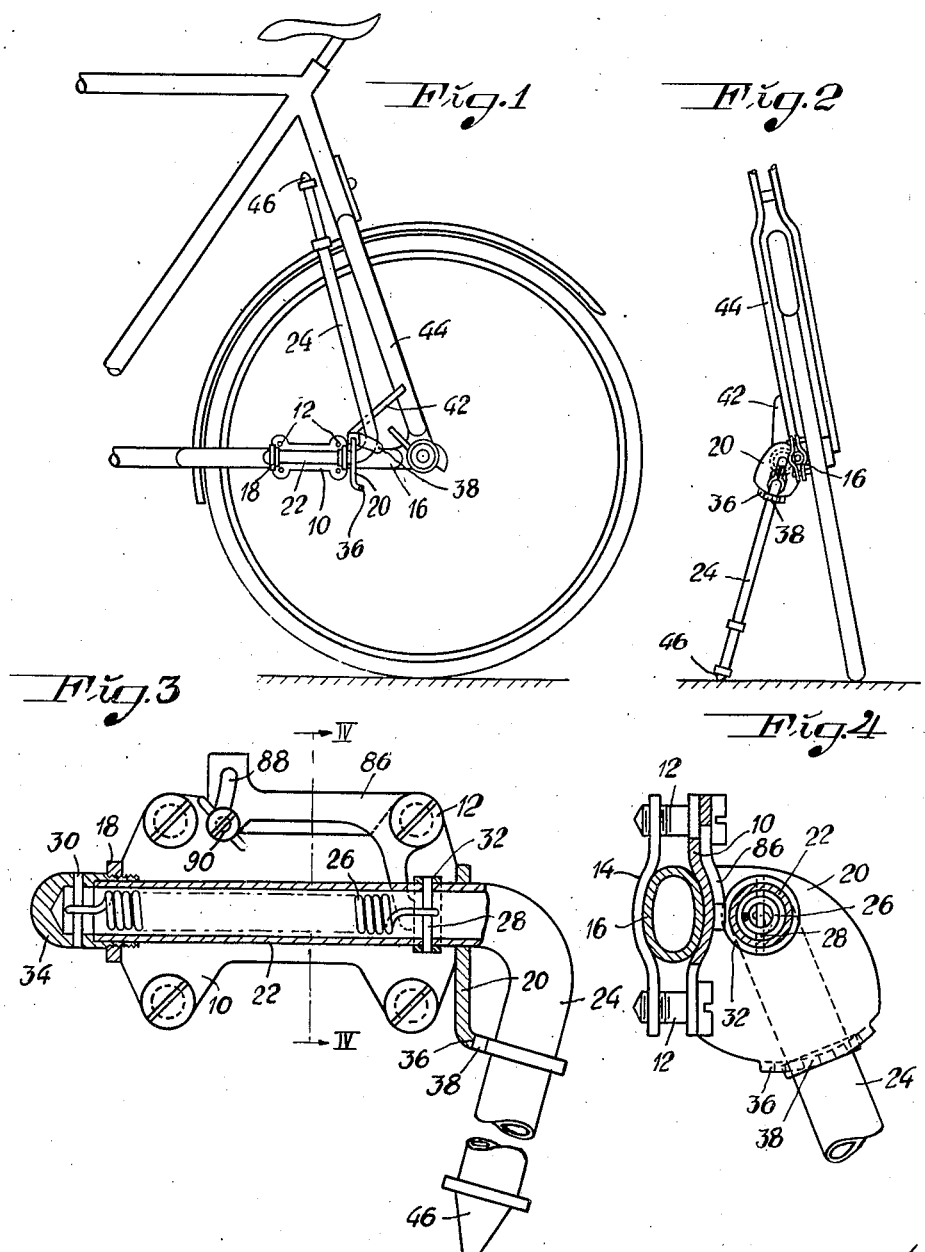

Patented May 21, 1940

2,201,922

UNITED STATES PATENT OFFICE 2,201,922

STRUT FOR CYCLES AND SIMILAR VEHICLES

Anders Johan Emil Rylander, Stockholm, Sweden

Application May 27, 1938, Serial No. 210,494
In Sweden May 28, 1937

4 Claims. (Cl. 280—301)

The present invention relates to struts for cycles and similar vehicles adapted to be applied to the frame of the cycle in order to keep same upright in freestanding position, and more particularly to cycle struts of this kind which from an upright position which the strut automatically tends to assume under spring action are adapted to be turned downwardly into engagement with the ground.

The principal object of the invention is to provide a cycle strut of the class described which is adapted to be blocked in turned-down position so as to prevent the strut from being unintentionally swung upwards under spring action out of engagement with the ground causing the cycle to topple over.

Another object of the invention is to provide a cycle strut of the class described which is adapted to be blocked in various positions of inclination in relation to the surface of the ground so as to adapt the strut to surfaces of ground of varying nature whereby a safe parking of the cycle is always attained.

Still another object of the invention is to provide a cycle strut of the class described in which the blocking of the strut in turned-down position takes place automatically.

These and other objects will be apparent according as the following description proceeds, reference being had to the accompanying drawing showing by way of example one embodiment of same.

In the drawing:

Figure 1 is a lateral view of the rear part of a cycle with a strut according to the invention applied to the frame of the cycle and shown in upright position;

Fig. 2 is a rear view of the cycle with the strut in turned-down position;

Fig. 3 is a lateral view of a strut operating mechanism according to the invention, some of the parts being shown in section; and Fig. 4 is a sectional view along the line IV—IV in Fig. 3.

The strut according to the invention comprises a plate 10 adapted by means of screws 12 and a fastening plate 14 to be clamped around one of the horizontal tubes 16 of the rear fork of a cycle. Provided at each end of plate 10 is an outwardly bent part or end plate 18 and 20, respectively, said plates forming bearings for the one arm 22 of an angularly bent rod 24 consisting preferably of tubing. The angle between the two arms or legs of the rod 24 may for instance be equal to that between the horizontal and vertically inclined tubes of the rear fork. Provided within the tubular arm 22 is a helical spring 26 fixed between two pins 28 and 30 of which one 28 passes through arm 22 and is secured to a ring 32 fixed around the arm 22, whereas the other pin 30 is secured to a protecting cap 34 screwed into plate 18.

The end plate 20 is formed to provide a toothed sector, and engaging the teeth 36 of said sector is a tooth 38 secured to the rod 24. Fixed to the end plate 20 is further a tail 42 bearing on the inclined tube 44 of the rear fork and preventing turning of the plate 10 around tube 16. To facilitate engagement of the strut with the ground the free end of the rod 24 may be pointed as shown at 46.

Before applying the strut to the cycle, rod 24 is turned in relation to plate 10 so as to give to spring 26 a certain initial tension. This turning motion should be performed in a clockwise direction as viewed in Fig. 3. Then the strut is secured to the frame tube 16 by means of plates 10 and 14 and screws 12. Thus, in clamped position of the strut on the cycle frame spring 26 tends to turn rod 24 in a counter-clockwise direction as viewed in Fig. 4, that is to keep it in upright position in which the rod may bear on the mud guard of the rear wheel. When the cycle is to be parked, rod 24 is turned downwardly through nearly half a revolution so as to bring point 46 into engagement with the ground when the cycle is inclined somewhat towards the strut (see Fig. 2).

A hook-shaped lever 86 is mounted on the shaft of one of the upper screws 12, one arm of said lever bearing on the ring 32 rigidly connected to rod 24. A thumb-screw 90 screwed into plate 10 engages a slot 88 at the end of the other arm of lever 86.

The mechanism described operates in the following manner. When the rod 24 is turned down from the position shown in Fig. 1 to the position indicated in Figs. 2 to 4, the tooth 38 will slide over the teeth 36 against the tensile action of the spring 26 which tends to keep the rod 24 in its left-hand end position in which the ring 32 bears on the end of the lever 86. When the rod has been turned to the desired angular position, it will be blocked in this position by the tooth 38 being forced into one of the spaces between the teeth 36 under the tensile action of the spring 26. The cycle can then be parked in the position shown in Fig. 2. In order to release the rod 24 from its blocked position, the left-hand arm of the lever 86 is pressed downwardly by hand or foot whereby its arm bearing on ring 32 displaces the rod in such direction (to the right in the figure) as to cause disengagement of tooth 38 with toothing 36, rod 24 being then turned into upright position by torsional action of the spring 26. Consequently, in this case the blocking of the rod in turned-down position takes place automatically, whereas its release from this position is effected by external manipulation.

In this embodiment the blocking device may be blocked in the position in which it blocks rod 24 by locking lever 86 by the thumb-screw 90 in the position said lever thereby assumes. Further the blocking device may be set out of function by depressing lever 86 and locking same in depressed position by the thumb-screw 90, rod 24 being thereby displaced to the right in the figure against the action of the spring 26. This may be desirable when the cycle is to be used under such constant conditions for a shorter or longer time that on account of the equal nature of the surface of ground no blocking of the strut in turned-down position is required.

What I claim is:

1. In a bicycle, a frame structure and a supporting device secured to said frame structure, said supporting device comprising a rod arranged to be turned from an upright position into engagement with the ground, a blocking device for locking said rod in its turned-down position, and a resilient spring arranged to tend always to turn said rod into its upright position and to put said blocking device into operative position.

2. In a bicycle, a frame structure and a supporting device secured to said frame structure, said supporting device comprising a rod arranged to be turned from an upright position into engagement with the ground, a blocking device for locking said rod in its turned-down position, and a helical spring arranged to turn said rod into its upright position by torsional force and to put said blocking device into operative position by tensile force.

3. In a bicycle, a frame structure and a supporting device secured to said frame structure, said supporting device comprising a rod arranged to be turned from an upright position into engagement with the ground, a blocking device for locking said rod in its turned-down position, and a helical spring arranged to turn said rod into its upright position by torsional force and to put said blocking device into operative position by tensile force, said rod comprising a substantially horizontal hollow portion encircling said spring and a portion bent angularly to said first-named portion and adapted to be brought into engagement with the ground.

4. In a bicycle, a frame structure and a supporting device secured to said frame structure, said supporting device comprising a rod arranged to be turned from an upright position into engagement with the ground, a blocking device for locking said rod in its turned-down position, said blocking device comprising a member stationary with respect to said frame structure and a member secured to said rod, a helical spring located within said rod and having one end secured to said frame structure and having its other end secured to said rod, and means forming a substantially horizontal pivot for said rod, said helical spring being arranged to turn said rod into its upright position about said pivot by torsional action and to shift said rod by tensile action whereby to engage said blocking members.

ANDERS JOHAN EMIL RYLANDER.